(12) United States Patent
Purcell

(10) Patent No.: US 7,082,423 B2
(45) Date of Patent: Jul. 25, 2006

(54) ENHANCED PROCESS FOR CONDUCTING POTENTIAL PROBLEM ANALYSIS

(75) Inventor: Ricky W. Purcell, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 621 days.

(21) Appl. No.: 10/259,993

(22) Filed: Sep. 27, 2002

(65) Prior Publication Data

US 2004/0064489 A1   Apr. 1, 2004

(51) Int. Cl.
    *G06F 19/00*   (2006.01)
    *G06N 5/04*   (2006.01)
(52) U.S. Cl. .............................. 706/46; 706/45; 706/47
(58) Field of Classification Search ................ 706/45, 706/46, 47
    See application file for complete search history.

(56) References Cited

U.S. PATENT DOCUMENTS

| | | | | |
|---|---|---|---|---|
| 6,681,156 B1 * | 1/2004 | Weiss | ........................ | 700/291 |
| 6,876,991 B1 * | 4/2005 | Owen et al. | ................... | 706/46 |
| 2003/0046284 A1 * | 3/2003 | Updegrove | ................... | 707/7 |

FOREIGN PATENT DOCUMENTS

WO    WO0002137    *   1/2000

OTHER PUBLICATIONS

Problem Solving & Decision Making, Kepner-Tregoe, Inc., 1989, United States.
The New Rational Manager, Charles H. Kepner & Benjamin B. Tregoe, 1981, Princeton, New Jersey.

* cited by examiner

*Primary Examiner*—Anthony Knight
*Assistant Examiner*—Sergey Datskovskiy
(74) *Attorney, Agent, or Firm*—Dority & Manning, P.A.

(57) ABSTRACT

A methodology for prioritizing between a number of anticipated problems employs a mathematical formula that considers probability and seriousness for each of a plurality of identified problems. Each of a plurality of problems is assigned a value for its seriousness, a value for its coefficient of seriousness, and a value for the probability of its occurrence. Once each of the identified problems is assigned these numerical values, then for each problem, the values of probability (P), coefficient of seriousness ($\sigma$) and seriousness (S) are entered into the following formula: $[P \times S]+[\sigma \times S]=RP$. The relative priority (RP) value that is calculated by this formula for each rated problem is then ranked to enable the decision-maker to decide which problems deserve to receive the most attention in the shortest period of time.

15 Claims, 1 Drawing Sheet

| PROBLEM | RP | S | σ | P | PREVENTION | RESPONSIBILITY | DATE | CONTINGENCY |
|---|---|---|---|---|---|---|---|---|
| 1 | 9.3 | 3 | 0.1 | 3 | | | Start-Up | |
| 2 | 9.3 | 3 | 0.1 | 3 | | | Start-Up | |
| 3 | 6.3 | 3 | 0.1 | 2 | | | Start-Up | |
| 4 | 6.3 | 3 | 0.1 | 2 | | | 15-Jul | |
| 5 | 6.3 | 3 | 0.1 | 2 | | | Start-Up | |
| 6 | 6.3 | 3 | 0.1 | 2 | | | Start-Up | |
| 7 | 6.2 | 2 | 0.1 | 3 | | | | |
| 8 | 6.2 | 2 | 0.1 | 3 | | | | |
| 9 | 6.2 | 2 | 0.1 | 3 | | | | |
| 10 | 6.2 | 2 | 0.1 | 3 | | | | |
| 11 | 6.2 | 2 | 0.1 | 3 | | | | |
| 12 | 6.2 | 2 | 0.1 | 3 | | | | |

| | PROBLEM | RP | S | σ | P | PREVENTION | RESPONSIBILITY | DATE | CONTINGENCY |
|---|---|---|---|---|---|---|---|---|---|
| 1 | | 9.3 | 3 | 0.1 | 3 | | | Start-Up | |
| 2 | | 9.3 | 3 | 0.1 | 3 | | | Start-Up | |
| 3 | | 6.3 | 3 | 0.1 | 2 | | | Start-Up | |
| 4 | | 6.3 | 3 | 0.1 | 2 | | | 15-Jul | |
| 5 | | 6.3 | 3 | 0.1 | 2 | | | Start-Up | |
| 6 | | 6.3 | 3 | 0.1 | 2 | | | Start-Up | |
| 7 | | 6.2 | 2 | 0.1 | 3 | | | | |
| 8 | | 6.2 | 2 | 0.1 | 3 | | | | |
| 9 | | 6.2 | 2 | 0.1 | 3 | | | | |
| 10 | | 6.2 | 2 | 0.1 | 3 | | | | |
| 11 | | 6.2 | 2 | 0.1 | 3 | | | | |
| 12 | | 6.2 | 2 | 0.1 | 3 | | | | |

FIG. 1

ENHANCED PROCESS FOR CONDUCTING POTENTIAL PROBLEM ANALYSIS

BACKGROUND OF THE INVENTION

In a paper published in 1989 by Kepner-Tregoe, Inc. entitled "Problem Solving and Decision Making," a potential problem analysis (PPA) process was described. Briefly, the PPA process assigns alphabetic symbols for the probability of an occurrence. The letters "H," "M" and "L" are used to indicate probabilities that are "High," "Moderate" or "Low," respectively. Similarly, each potential problem is assigned an alphabetic symbol according to the seriousness of the problem. The letters "H," "M" and "L" are used to indicate seriousness that is "High," "Moderate" or "Low," respectively. Accordingly, the PPA process assigns equal weight to probability and seriousness. With this method, the HH problems clearly should be addressed, and the LL problems clearly should be assigned lowest priority. However, the PPA process is vague as to the prioritization of potential problems that are outside of the high probability/high seriousness or low probability/low seriousness ratings. For example, given a larger number of HM problems than resources can address, which ones are best pursued? Additionally, if all HM problems (high probability/moderate seriousness and moderate probability/high seriousness) are addressed, what is the next priority? Is it high probability/low seriousness, or is it low probability/high seriousness? Moreover, application of the PPA process often yields a result that lists a number of potential problems with the same rank of combined probability and seriousness, leaving the user unsure of which problems should be given priority and addressed in detail in a given time frame.

OBJECTS AND SUMMARY OF THE INVENTION

Objects and advantages of the invention will be set forth in part in the following description, or may be obvious from the description, or may be learned through practice of the invention.

The presently preferred embodiment of the invention provides a thorough prioritization method for a group of potential problems. The presently preferred embodiment of the invention employs a mathematical formula that considers probability and seriousness for each identified problem. Each of the identified potential problems is assigned a numerical value of one, two or three for the probability of the occurrence of that problem, where one is a low probability that the problem will occur, two is a moderate probability that the problem will occur, and three is a high probability that the problem will occur.

Additionally, each of the identified problems is rated for seriousness by being assigned a numerical value of one, two or three, where one is assigned if the seriousness of the problem is low, two is assigned if the seriousness of the problem is moderate, and three is assigned if the seriousness of the problem is high.

Once each of the identified problems is assigned a numerical value for the probability of its occurrence and the seriousness of the problem, then for each problem, the values of probability (P) and seriousness (S) are entered into the following formula: $[P \times S] + [\sigma \times S] = RP$. In this formula, the probability (P) of the occurrence of the problem is multiplied by the seriousness (S) of the problem, and the product of this multiplication is added to the product that results from the multiplication of the coefficient of seriousness ($\sigma$) of the problem by the seriousness (S) of the problem. The coefficient of seriousness of the problem may change depending on the class of problem that is being analyzed. However, in a presently preferred embodiment of the invention, for most problems, a value of 0.1 has been used for the coefficient of seriousness ($\sigma$) of the problem.

The number that is calculated from applying this formula indicates the relative priority (RP) of each potential problem. Note that the formula of the present invention gives an added weight to the seriousness value (S) relative to the probability value (P). In accordance with the presently preferred embodiment of the invention, the seriousness of the problem is considered to pose a greater overall threat and thus requires greater degrees of attention at an earlier time.

Additionally, the relative priorities of the problems are compared and prioritized from highest relative priority (RP) to lowest relative priority (RP). The presently preferred embodiment of the invention uses an EXCEL brand spreadsheet template that automatically calculates the relative priority (RP) for each problem and then sorts all of the relative priority (RP) values from highest to lowest and thus arranges the potential problems by priority level.

Furthermore, the presently preferred embodiment of the invention also includes the assignment of responsibility to an identified individual as well as a target date for the completion of the preventative actions that are identified in the process. In other words, by employing the potential problem analysis process of the presently preferred embodiment of the invention, the problems that attain higher overall relative priority (RP) values must be dealt with by a particular individual within a particular time frame.

BRIEF DESCRIPTION OF THE DRAWING

FIG. 1 is an embodiment of an EXCEL brand spreadsheet template programmed in accordance with a presently preferred embodiment of the invention.

DETAILED DESCRIPTION OF THE INVENTION

Reference now will be made in detail to the presently preferred embodiments of the invention. Each example is provided by way of explanation of the invention, not limitation of the invention. In fact, it will be apparent to those skilled in the art that various modifications and variations can be made in the present invention without departing from the scope or spirit of the invention. For instance, features described as part of one embodiment of the invention, can be used on another embodiment to yield a still further embodiment. Thus, it is intended that the present invention covers such modifications and variations as come within the scope of the appended claims and their equivalents.

The potential problem analysis process of the present invention provides the decision-maker with a methodology for dealing with a number of anticipated problems. The potential problem analysis process of the present invention enhances the prioritization of potential problems that are outside of the high probability/high seriousness or low probability/low seriousness ratings. To accomplish this goal, the presently preferred embodiment of the invention employs a mathematical formula that considers probability and seriousness for each identified problem.

The first step in the process is to identify a plurality of potential problems that face the decision-maker. The problems need not be related in origin, nor need they impact a common target.

For each identified potential problem, a numerical value is assigned to represent the probability of the occurrence of that particular problem. Each of the identified potential problems is assigned a numerical value of one, two or three for the probability of the occurrence of that problem. A value of one is assigned if it is anticipated that there is a low probability that the problem will occur. A value of two is assigned if it is anticipated that there is a moderate probability that the problem will occur. A value of three is assigned if it is anticipated that there is a high probability that the problem will occur.

Additionally, each of the identified problems is rated for its seriousness if it were to occur. The seriousness is a parameter that provides a relative measure of the problem's potential for causing harm. For each identified potential problem, a numerical value is assigned to represent how serious it would be if that particular problem were to occur. Each of the identified potential problems is assigned a numerical value of one, two or three to represent the relative seriousness of the occurrence of that problem. A value of one is assigned if the seriousness of the occurrence of that problem is deemed to be low. A value of three is assigned if the seriousness of the occurrence of that problem is deemed to be high. A value of two is assigned if the seriousness of the occurrence of that problem is deemed to be other than high or low.

For each identified potential problem, a numerical value must be assigned to represent the coefficient of seriousness ($\sigma$) of that particular problem. The coefficient of seriousness of the problem may change depending on the class or category of problem that is being analyzed. Once the total universe of problems is known, the coefficient of seriousness ($\sigma$) provides a way to assign relative priority to different types of problems. For example, if the universe includes problems that bear on safety issues, problems that deal with issues of quality of the end product, and problems that deal with production issues like up-time and yield, one might choose the following values for the coefficient of seriousness ($\sigma$). Problems that bear on safety issues would be assigned a coefficient of seriousness ($\sigma$) of 0.3. Problems that bear on quality issues would be assigned a coefficient of seriousness ($\sigma$) of 0.2. Problems that bear on production issues like up-time or yield would be assigned a coefficient of seriousness ($\sigma$) of 0.1. In a universe with only one category of problems, a value of 0.1 would suffice for the coefficient of seriousness ($\sigma$) of the problem.

Once each of the identified problems is assigned a numerical value for the probability (P) of its occurrence, the seriousness (S) of the problem, and the coefficient of seriousness ($\sigma$) for the problem, then for each problem, the values of probability (P), seriousness (S) and coefficient of seriousness ($\sigma$) are entered into the following formula: $[P \times S]+[\sigma \times S]=RP$. In this formula, the probability (P) of the occurrence of the problem is multiplied by the seriousness (S) of the problem to obtain a first product. The seriousness (S) of the problem is multiplied by the coefficient of seriousness ($\sigma$) of the problem to obtain a second product. Then the first product is added to the second product, and the sum of these two products yields the determination of the relative priority (RP) of that particular problem.

Once the individual values are assigned, then a spreadsheet software product can be programmed to perform the individual calculations that are required by the formula. As shown in FIG. 1 for example, the EXCEL brand spreadsheet available from Microsoft of Redmond, Wash. can be programmed with the above formula and used to automatically perform the calculation of the relative priority (RP) value for each problem.

Additionally, the relative priorities of the problems are ranked. Each relative priority (RP) value for each problem is compared to the values calculated for the other problems and prioritized from highest relative priority (RP) to lowest relative priority (RP). A presently preferred embodiment of the invention uses an EXCEL brand spreadsheet template that automatically calculates the relative priority (RP) for each problem and then sorts all of the relative priority (RP) values from highest to lowest, thus arranging the potential problems by priority level. By using a spreadsheet software product, the potential problem analysis process of the present invention yields a more effective and efficient means of facilitating the existing potential problem analysis processes by replacing the manual input that employs a traditional easel and markers. As shown in FIG. 1 for example, an EXCEL brand spreadsheet template has been programmed to automatically calculate the relative priority (RP) for each of twelve problems. Additionally, the EXCEL brand spreadsheet template shown in FIG. 1 has been programmed to automatically sort all of the relative priority (RP) values from highest to lowest, thus arranging the potential problems by priority level, with the higher priorities at the top of the listing.

Another presently preferred embodiment uses a personal computer projector in combination with an EXCEL brand spreadsheet template as noted above. In this way, information entry, calculations and sorting can all be done in real time and projected for viewing by participants in a meeting and reference by the facilitator of the meeting. Thus, easels and markers are not needed. Nor is there any need to reduce a multitude of easel note-sized pages to a size that can be published as meeting notes after the PPA process is completed.

Note that the formula of the present invention uses the coefficient of seriousness ($\sigma$) of the problem to give an added weight to the seriousness value (S) relative to the probability value (P). In accordance with a presently preferred embodiment of the invention, the seriousness of the problem is considered to pose a greater overall threat and thus requires a greater degree of attention at an earlier time. Moreover, by employing this artifice of the coefficient of seriousness ($\sigma$) of the problem, the methodology of the present invention is less likely to present the decision-maker with a number of equally ranked relative priority (RP) values. The potential problem analysis process of the present invention gives the user a more thorough rank ordered listing of potential problems than existing potential problem analysis processes afford. Thus, the potential problem analysis process of the present invention provides the decision-maker with a better indication of which potential problems need to be addressed in detail. This information enables the decision-maker to become more efficient in dealing with problems and therefore provides the decision-maker with the ability to address a greater number of potential problems in a given time frame.

For example, if the ten highest scores of relative priority (RP) are two scores of 9.9, two scores of 9.6, two scores of 9.3, two scores of 6.6, and two scores of 6.3, and there are only enough resources to deal with the top eight problems, then preventative and resolution planning activities are assigned to these eight relatively higher scored problems. Thus, the potential problem analysis process of the present invention increases the likelihood that preventative measures will be implemented with emphasis on problem seriousness at the conclusion of the application of the process.

In an ideal world, the decision-maker would implement preventative measures and pre-plan reactionary measures for all identified potential problems. The time and resource constraints in the real world make this impractical. Thus, prioritization is critical. As there is often a positive correlation between the seriousness of a problem and the difficulty of its resolution, extra weight has intentionally been given to seriousness relative to probability in the prioritization method of the present invention. This relative weighting will increase the likelihood of resources being dedicated to prevention and pre-planned resolution measures for higher seriousness potential problems. This relative weighting also implies that higher probability potential problems with lower seriousness are less likely (i.e. prioritized lower) to be addressed in a preventative mode. However, this is a conscious trade-off, as lower seriousness problems are often easily resolved in a reactionary mode. The ranking of the relative priority (RP) value that is calculated by this formula for each rated problem identifies for the decision-maker, which problems deserve to receive the most attention in the shortest period of time and which problems can be essentially ignored unless and until additional resources become available.

Furthermore, a presently preferred embodiment of the invention also can include the assignment of responsibility to an identified individual as well as a target date for the completion of the preventative actions that are identified in the process. In other words, by employing the potential problem analysis process of a presently preferred embodiment of the invention, the problems that attain the higher overall relative priority (RP) values must be dealt with by a particular individual within a particular time frame. Once ranking and sorting of the problems are completed, preventative and resolution planning activities are assigned for as many of the potential problems with the higher scores as is achievable with available resources.

The assignment of preventative and resolution planning activities can occur in a collaborative manner. The resources available to the project may include individuals who are participants in the project as well as individuals who are outside of the project but possess particular areas of expertise that can be called upon by the project's participants. Once the problems of higher priority are identified, then the participants in the project can reach a consensus on the identity of the project participant or participants who are available and best able to implement the identified preventative measures and any contingency activities that would be implemented in the event that the problem cannot be resolved by the preventative measures. In the template example shown in FIG. 1 for example, this/these participant (s) would be listed under the column titled "RESPONSIBILITY," the preventative measures would be listed under the column titled "PREVENTION," and the contingency activities would be listed under the column titled "CONTINGENCY." Additionally, the deadline for this/these participants to implement the preventative measures would be listed under the column titled "DATE."

While the specification has been described in detail with respect to specific embodiments of the invention, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed:

1. A method of analyzing potential problems for the purpose of improving allocation of human resources in an organization, the method adapted to run on a computer, the steps of the method comprising:
   identifying a plurality of potential problems facing the organization in a given time frame;
   for each identified potential problem, assigning a numerical value for the probability of the occurrence of the problem during said time frame;
   for each identified potential problem, assigning a numerical value for the seriousness of the problem;
   for each identified potential problem, using the computer to calculate a first product of the value assigned for the probability of the problem's occurrence and the value assigned for the problem's seriousness;
   for each identified potential problem, assigning a numerical value for the coefficient of seriousness of the problem;
   for each identified potential problem, using the computer to calculate a second product of the value assigned for the coefficient of seriousness of the problem and the value assigned for the problem's seriousness;
   for each identified potential problem, using the computer to calculate a relative priority value from the sum of the first product and the second product and to use this sum to generate a plan that accordingly allocates human resources;
   the transformation of the plan into a data format that can be displayed on a projector;
   the provision of such formatted data to the projector; and
   the display of the plan by the projector.

2. A method as in claim 1, wherein the numerical value that is assigned for the probability of the occurrence of the problem is equal to one where there is a low probability that the problem will occur, two where there is a moderate probability that the problem will occur, and three where there is a high probability that the problem will occur.

3. A method as in claim 1, wherein before assigning the numerical value for the probability of the occurrence of the problem, determining whether the probability of the occurrence of the problem is one of a low probability that the problem will occur, a moderate probability that the problem will occur, and a high probability that the problem will occur.

4. A method as in claim 3, wherein the numerical value that is assigned for the probability of the occurrence of the problem is equal to one where there is a low probability that the problem will occur, two where there is a moderate probability that the problem will occur, and three where there is a high probability that the problem will occur.

5. A method as in claim 1, wherein the numerical value that is assigned for the seriousness of the problem is equal to one where the seriousness of the problem is low, two where the seriousness of the problem is moderate, and three where the seriousness of the problem is high.

6. A method as in claim 1, wherein before assigning the numerical value for the seriousness of the problem, determining whether the seriousness of the problem is low, moderate, or high.

7. A method as in claim 6, wherein the numerical value that is assigned for the seriousness of the problem is equal to one where the seriousness of the problem is low, two where the seriousness of the problem is moderate, and three where the seriousness of the problem is high.

8. A method as in claim 1, further comprising:
using a spreadsheet software product to perform the calculating act of each the relative priority value for each the problem.

9. A method as in claim 1, wherein the coefficient of seriousness is assigned a numerical value of 0.1.

10. A method as in claim 1, further comprising:
ranking each the relative priority value relative to each other the relative priority value from highest relative priority value to lowest relative priority value.

11. A method as in claim 10, further comprising:
using a spreadsheet software product to perform the ranking of the relative priority values and to sort the ranked priority values from highest relative priority value to lowest relative priority value.

12. A method of analyzing potential problems for the purpose of improving allocation of human resources in an organization, the method adapted to run on a computer, the steps of the method comprising:
identifying a plurality of potential problems facing the organization in a given time frame;
for each identified potential problem, determining whether the probability of the occurrence of the problem is low, moderate, or high;
for each identified potential problem, assigning a numerical value for the probability of the occurrence of the problem during said time frame wherein the numerical value is equal to one where there is a low probability that the problem will occur, two where there is a moderate probability that the problem will occur, and three where there is a high probability that the problem will occur;
for each identified potential problem, determining whether the seriousness of the problem is low, moderate, or high;
for each identified potential problem, assigning a numerical value for the seriousness of the problem wherein the numerical value is equal to one where the seriousness of the problem is determined to be low, two where the seriousness of the problem is determined to be moderate, and three where the seriousness of the problem is determined to be high;
for each identified potential problem, using the computer to calculate a first product of the value assigned for the probability of the problem's occurrence and the value assigned for the problem's seriousness;
for each identified potential problem, assigning a numerical value for the coefficient of seriousness of the problem;
for each identified potential problem, using the computer to calculate a second product of the value assigned for the coefficient of seriousness of the problem and the value assigned for the problem's seriousness;
for each identified potential problem, using the computer to calculate a relative priority value from the sum of the first product and the second product;
using the computer to rank each the relative priority value relative to each other the relative priority value from highest to lowest and to use this sum to generate a plan that accordingly allocates human resources;
transforming the plan into a data format that can be displayed on a projector;
providing such formatted data to the projector; and
using the projector to display the plan to an assembly of members of the organization.

13. A method as in claim 12, further comprising:
using a spreadsheet to perform the ranking of the relative priority values and using said spreadsheet software product to sort the relative priority values from highest relative priority value to lowest relative priority value.

14. A method as in claim 12, further comprising:
using a spreadsheet software product to perform the calculating act of each the relative priority value for each the problem.

15. A method as in claim 12, wherein the coefficient of seriousness is assigned a numerical value of 0.1.

* * * * *

UNITED STATES PATENT AND TRADEMARK OFFICE
CERTIFICATE OF CORRECTION

| | | |
|---|---|---|
| PATENT NO. | : 7,082,423 B2 | Page 1 of 1 |
| APPLICATION NO. | : 10/259993 | |
| DATED | : July 25, 2006 | |
| INVENTOR(S) | : Ricky W. Purcell | |

It is certified that error appears in the above-identified patent and that said Letters Patent is hereby corrected as shown below:

Please correct column 8, line 28 to read as follows:

using a spreadsheet software product to perform the ranking on the relative

Signed and Sealed this

First Day of May, 2007

JON W. DUDAS
*Director of the United States Patent and Trademark Office*